US011122816B2

(12) United States Patent
Yang et al.

(10) Patent No.: US 11,122,816 B2
(45) Date of Patent: Sep. 21, 2021

(54) VISCOUS SEMI-LIQUID FOOD DISPENSER AND METHOD AND SYSTEM FOR CONTROLLING FOOD CHARACTERISTICS

(71) Applicant: NESTEC S.A., Vevey (CH)

(72) Inventors: Lin Yang, Shanghai (CN); Rong Chen, Shanghai (CN)

(73) Assignee: Societe des Produits Nestle S.A., Vevey (CH)

( * ) Notice: Subject to any disclaimer, the term of this patent is extended or adjusted under 35 U.S.C. 154(b) by 490 days.

(21) Appl. No.: 16/092,321

(22) PCT Filed: Apr. 14, 2016

(86) PCT No.: PCT/CN2016/079276
§ 371 (c)(1),
(2) Date: Oct. 9, 2018

(87) PCT Pub. No.: WO2017/177417
PCT Pub. Date: Oct. 19, 2017

(65) Prior Publication Data
US 2021/0204563 A1    Jul. 8, 2021

(51) Int. Cl.
*A23G 9/22* (2006.01)
*A23G 9/12* (2006.01)
(Continued)

(52) U.S. Cl.
CPC .............. *A23G 9/228* (2013.01); *A23G 1/20* (2013.01); *A23G 9/12* (2013.01); *G05B 19/4155* (2013.01); *G05B 2219/2645* (2013.01)

(58) Field of Classification Search
CPC .......... A23G 9/228; A23G 9/12; A23G 9/224; A23G 1/20; G05B 19/4155; G05B 2219/2645; B01F 7/162
See application file for complete search history.

(56) References Cited

U.S. PATENT DOCUMENTS

| 4,653,281 A | 3/1987 | Van Der Veer |
| 6,091,887 A * | 7/2000 | Dieterle ................. G05B 11/28 388/811 |
| 2013/0344204 A1* | 12/2013 | Goodson ........... B01F 15/00253 426/231 |

FOREIGN PATENT DOCUMENTS

| CN | 201163974 | 12/2008 |
| CN | 201365492 | 12/2009 |

(Continued)

*Primary Examiner* — Emmanuel E Duke
(74) *Attorney, Agent, or Firm* — K&L Gates LLP (57) ABSTRACT

A control method for a viscous semi-liquid frozen or hot food dispenser comprising a stirring means configured to stir the food, a motor (50) configured to drive the stirring means to rotate, a refrigerating means or heating means configured to input cold energy or heat energy into the food, a rotation speed sensor (80) configured to detect a stirring speed, and a temperature sensor (13) configured to detect the food temperature, the control method comprising the steps of: a) refrigerating or heating the food by the refrigerating means or heating means; b) comparing the food temperature detected by the temperature sensor (13) with a target preset value of the food temperature, and determining to continue the refrigeration or heating, or to stop the refrigeration or heating and to keep stopping for a preset time; c) intervening by corresponding adjustment of the target preset value when a data set collected from the rotation speed sensor (80) shows that change trend of the rotation speed meets predefined intervention conditions; and d) returning to step a) for the next cycle. The control method for a viscous semi-liquid food dispenser is capable of controlling viscosity of food accurately and reliably to maintain consistence of the characteristics of the dispensed product and minimize the influence from the environment as much as possible.

19 Claims, 7 Drawing Sheets

(51) Int. Cl.
*G05B 19/4155* (2006.01)
*A23G 1/20* (2006.01)

(56) References Cited

FOREIGN PATENT DOCUMENTS

| | | | | |
|---|---|---|---|---|
| CN | 102972613 A | | 3/2013 | |
| CN | 102972613 A | * | 3/2013 | |
| CN | 202980061 | | 6/2013 | |
| CN | 104509657 | | 4/2015 | |
| EP | 2067407 | | 6/2009 | |
| EP | 2716189 A1 | * | 4/2014 | .......... A47J 31/4482 |
| JP | S63123343 A | | 5/1988 | |
| JP | H05146256 A | | 6/1993 | |
| JP | H10185382 A | | 7/1998 | |
| JP | 2000166780 A | | 6/2000 | |
| JP | 2001245601 A | | 9/2001 | |
| JP | 2001245601 A | * | 9/2001 | |
| JP | 2004313182 A | | 11/2004 | |
| JP | 2006280227 | | 10/2006 | |
| JP | 2014054193 A | | 3/2014 | |
| KR | 100751915 | | 8/2007 | |
| KR | 100751915 B1 | * | 8/2007 | |
| RU | 85628 U1 | | 8/2009 | |
| RU | 2429288 C1 | | 9/2011 | |

* cited by examiner

VISCOUS SEMI-LIQUID FOOD DISPENSER AND METHOD AND SYSTEM FOR CONTROLLING FOOD CHARACTERISTICS

CROSS REFERENCE TO RELATED APPLICATIONS

The present application is a National Stage of International Application No. PCT/CN2016/079276, filed on Apr. 14, 2016, the entire contents of which are being incorporated herein by reference.

TECHNICAL FIELD

The present application relates to a system and method for controlling characteristics of viscous semi-liquid food, and a viscous semi-liquid food dispenser having the control system.

BACKGROUND ART

With the development of economy and the continuous improvement of living standard, consumption of yogurt or ice cream is increasing and the market demand for frozen food dispensers such as yogurt machines or ice cream machines is increasingly growing year by year. Therefore, market survival competence and competitiveness of a food directly depends on reliability of the control performance of the food dispenser. Taking an ice cream dispenser for example, the overrun is one of the most important characteristics of an ice cream product, having great impacts on the quality and taste of the ice cream. In the process of selling ice cream products, it is necessary to maintain a constant temperature of ice cream raw materials in a refrigerated hopper of the ice cream dispenser and meanwhile to control a stirring means to stir at a constant speed in order to maintain the overrun at a constant level and hence consistent taste. During the dispensing from time to time, low mixing speed may result in insufficient mixing of the raw material and uneven entrainment of air, and high mixing speed may result in low chance of entrainment of air. Excessively increased temperature in the refrigerated hopper may lead to partial melting of the ice cream raw materials, and excessively decreased temperature therein may lead to hardening of the ice cream raw materials and increased difficulty in stirring. As a result, the overrun characteristic of ice cream products will be affected inevitably, directly leading to the degradation of taste and quality of the product.

There are a variety of control systems for controlling product characteristics of an ice cream machine on the market, most of which are of temperature-based control types, i.e. to perform monitoring by using data measured by a temperature sensor. The control principle is to retain the characteristics of the ice cream product consistent by controlling the food temperature at a certain range. However, this control method neglects the following factors: 1) the consistence control of the temperature is not accurate enough to avoid the reduction of the overrun of the product; 2) temperature monitoring is an indirect monitoring method, hence leading to lagging of the control response of the machine; 3) the characteristics of dispensed product are severely influenced by environment factors, such as ambient temperature, frequency of the dispensing.

In addition, Chinese utility model CN201163974Y discloses a soft ice cream machine of rotation speed controlled type, wherein a control system of such a machine comprises a central processing unit (CPU), an LED and LCD display screen connected with the central processing unit respectively, an operation panel, a rotation speed sensor and a drive circuit; the rotation speed sensor is installed beside an output shaft of a speed reducer of the ice cream machine or beside an output shaft of an electromotor. The utility model determines the softness and hardness of the ice cream by using the rotation speed sensor to detect variation in rotation speed of a stirring motor caused by load variation and then by using the CPU. In practice, the method set forth in this utility model is unable to accurately identify the softness and hardness of the ice cream because of measurement error and thus it is not reliable.

Chinese utility model CN201365492Y illustrates a soft ice cream machine with a control system capable of on-line detection of rotation speed, wherein a no-load rotation speed sampling selector switch is arranged and connected with a central processing unit (CPU). The control principle of this utility model is having a no-load rotation speed value (which is obtained by on-line no-load rotation speed detection) stored in a chip to serve as a starting point value, using a sensor to detect a rotation speed change of a stirring motor caused by load variation, and then determining the softness and hardness of the ice cream by the deviation compared with the no-load baseline by the CPU. This control method suffers from the following defects: the monitoring accuracy for determining the softness and hardness of the ice cream is not sufficient enough to determine the overrun variation of the ice cream. Furthermore, compared with the overrun variation of the ice cream, a lagging takes place in the monitoring of the rotation speed change. Consequently, this control method may result in considerable oscillation of the characteristics of the ice cream product, e.g. over-reaction of the CPU, and thus it may be unable to ensure stability in quality of the dispensed product.

In view of the above, the present invention is intended to overcome one or more of the above defects.

SUMMARY OF THE INVENTION

The objective of the present invention is to provide a control method for a viscous semi-liquid food dispenser, which is capable of controlling viscosity of food accurately and reliably to maintain consistence of the characteristics (particularly the characteristics associated with the viscosity) of the dispensed product and minimize the influence from the environment as much as possible.

The above objective of the invention is achieved based on the realization that the viscosity changes as the temperature of food changes, which can be directly indicated by the change in rotational speed of the motor output shaft or the stirring means that is in contact with the food.

According to one aspect of the invention, a control method is provided for a viscous semi-liquid frozen food dispenser comprising a stirring means configured to stir the food, a motor configured to drive the stirring means to rotate, a refrigerating means configured to input cold energy into the food, a rotation speed sensor configured to detect a stirring speed, and a temperature sensor configured to detect a food temperature, the control method comprising the steps of:

a) refrigerating the food by the refrigerating means;
b) comparing a food temperature detected by the temperature sensor with a target preset value of the food temperature, and determining to continue the refrigeration when the food temperature is greater than or equal to the target preset value, and to stop the refrigeration and keep stopping for a preset time when the food temperature is lower than the target preset value;

c) intervening by corresponding adjustment of the target preset value when a data set collected from the rotation speed sensor shows that change trend of the rotation speed meets predefined intervention conditions; and d) returning to step a) for the next cycle.

The control algorithm of the present invention avoids the influence from the environment by using real-time monitored data as well as dynamic monitoring and self-adaptive fuzzy control technology. Particularly, analysis and monitoring of the change trend of rotation speed parameters indicative of viscosity is intended for pre-warning, which enables timely and appropriate reaction from the machine.

According to another aspect of the invention, a control method is provided for a viscous semi-liquid hot food dispenser comprising a stirring means configured to stir the food, a motor configured to drive the stirring means to rotate, a heating means configured to input heat energy into the food, a rotation speed sensor configured to detect a stirring speed, and a temperature sensor configured to detect a food temperature, the control method comprising the steps of:

a) heating the food by the heating means;

b) comparing a food temperature detected by the temperature sensor with a target preset value of the food temperature, and determining to continue the heating when the food temperature is lower than or equal to the target preset value, and to stop the heating and keep stopping for a preset time when the food temperature is greater than the target preset value;

c) intervening by corresponding adjustment of the target preset value when a data set collected from the rotation speed sensor shows that change trend of the rotation speed meets predefined intervention conditions; and d) returning to step a) for the next cycle.

Preferably, the rotation speed sensor measures a rotation speed of a motor output shaft. The measurement accuracy of the sensor is closely related to the position of the sensor. Because of existence of a reduction gear box, the smallest recognizable step in this invention is quite small. For instance, during the application of the present invention, the gear ratio of the reduction gear box is 1:83.5, which means that if the low speed gear rotates 1 round, the high speed gear rotates 83.5 rounds. Considering the maximum of the identifiable difference in rotation speed is less than 30 rounds per minute, by using the control method of the present invention, the data recorded is much more accurate, and the machine is more sensitive to make quick response (the control accuracy may meet the requirement of less than ±2%).

Preferably, a data set in step c) is composed of a plurality of cycle index data of a plurality of consecutive cycles.

Preferably, during a cycle consisting of step a) and step b), the rotation speed data measured during the refrigeration or heating period is averaged to serve as the cycle index data.

Preferably, for frozen food dispenser, the target preset value of the food temperature is lowered when the plurality of cycle index data shows a monotonically increase according to time sequence of the cycles, and a difference between the maximum index data and the minimum index data is larger than a preset difference value. For hot food dispenser, the target preset value of the food temperature is raised when the plurality of cycle index data shows a monotonically increase according to time sequence of the cycles, and a difference between the maximum index data and the minimum index data is larger than a preset difference value.

Preferably, for frozen food dispenser, the target preset value of the food temperature is raised when the plurality of cycle index data shows a monotonically decrease according to time sequence of the cycles, and the difference between the maximum index data and the minimum index data is larger than the preset difference value. For hot food dispenser, the target preset value of the food temperature is lowered when the plurality of cycle index data shows a monotonically decrease according to time sequence of the cycles, and the difference between the maximum index data and the minimum index data is larger than the preset difference value.

Preferably, the target preset value of the food temperature is adjusted by a constant value.

According to another aspect of the invention, a control system for a viscous semi-liquid food dispenser is provided, comprising a stirring means configured to stir a food, a motor configured to drive the stirring means to rotate, a temperature regulating means configured to input heat energy or cold energy into the food, the control system comprising a main control module and a data acquisition module comprising a rotation speed sensor configured to detect a stirring speed and a temperature sensor configured to detect a food temperature, the main control module is configured to receive data signals from the rotation speed sensor and the temperature sensor, to control operation of the temperature regulating means based on a comparison result between an actual food temperature and a target preset value of the food temperature, and analyze rotation speed data from the rotation speed sensor so that when the data analysis shows that the change trend of the rotation speed meets predefined intervention conditions, intervention is carried out by corresponding adjustment of the target preset value.

Preferably, the rotation speed sensor is mounted on a motor output shaft.

In a mode, the temperature regulating means is a refrigerator means. The refrigerating means is preferably a cylinder type evaporator. The cylinder type evaporator is comprised in a refrigeration circuit with a compressor, and the main control module controls on or off of the compressor based on the comparison result of the actual food temperature and the target preset value of the food temperature.

In a second mode, the temperature regulating means is a heating means. Preferably, the heating means is preferably an electrical heating coil.

According to a further aspect of the invention, a viscous semi-liquid food dispenser is provided, having the control system set forth above. The dispenser may be e.g. an ice cream dispenser, a slush dispenser or a milk shake dispenser or a hot chocolate syrup dispenser.

According to the control system and method of the invention, both the product temperature parameter which is an indirect indication of product viscosity and the rotation speed parameter of the motor output shaft which is an direct indication of the product viscosity (which may be an indication of "overrun" in terms of ice cream) are considered, and the variation trend of the product characteristics is predicted based on these parameters, and thus an intervention can be triggered in advance, thereby overcoming the defects of lagging of existing temperature-based control and great deviation of rotation speed-based control, achieving remarkable self-adaptiveness, preventing influence from environment on the dispenser, and obtaining more accurate, more reliable and more sensitive control characteristics.

BRIEF DESCRIPTION OF THE DRAWINGS

The embodiments of the present invention will be illustrated in detail with reference to the drawings, in which.

DETAILED DESCRIPTION OF THE EMBODIMENTS

The invention is further described with reference to the following examples. It will be appreciated that the invention as claimed is not intended to be limited in any way by these examples.

Figure 1:
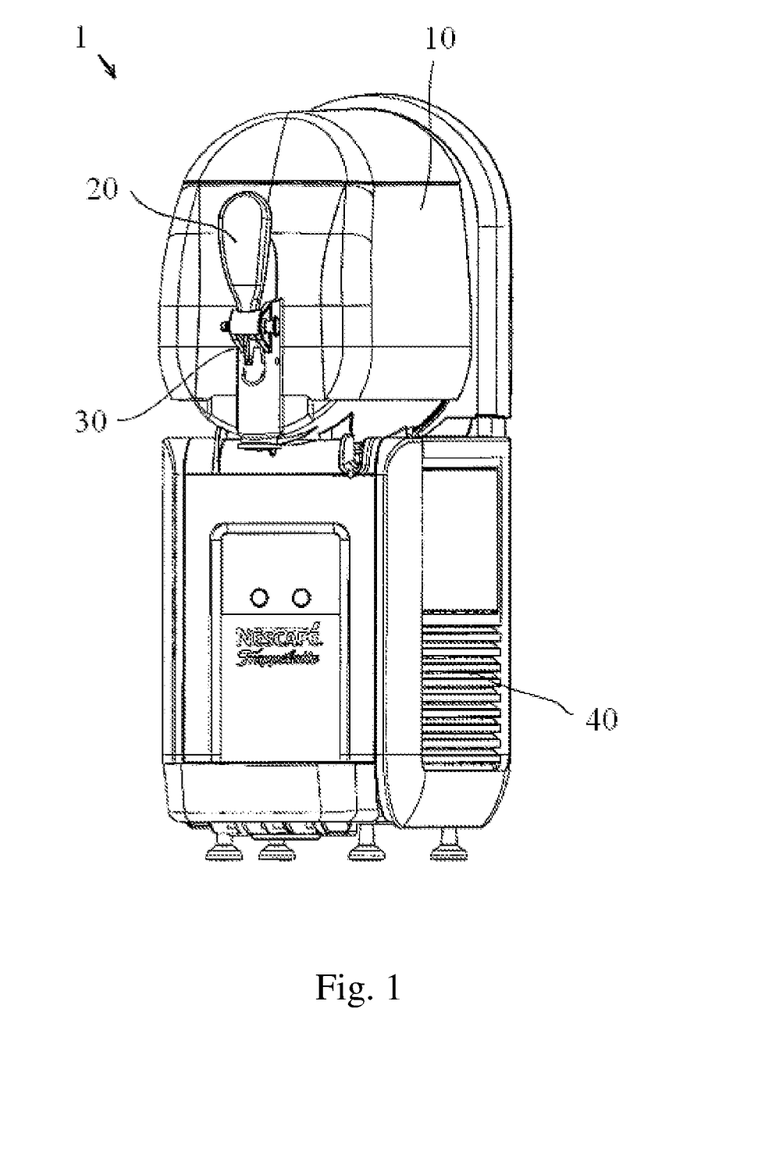
FIG. 1 is a general perspective view of a dispenser according to the present invention.

FIG. 1 shows a dispenser 1 for producing and dispensing a viscous semi-liquid food, the dispenser comprising a hopper 10 for containing a semi-liquid food raw material. A temperature regulating means (not shown) for adjusting raw material temperature, e.g. a refrigerating means embodied as a cylinder type evaporator, and/or a heating means embodied as an electrical heating coil for heating the raw material, is provided inside the hopper. In addition, the dispenser further comprises a stirring means extending into the raw material to stir it, e.g. a preferably spiral scraper disposed around the cylinder type evaporator.

The dispenser is provided with a manipulating handle 20 at the front to control dispensing of the product. The manipulating handle is configured to be lowered or pressed for product dispensing through a dispensing outlet 30 disposed above a front area of the dispenser. The front area of the dispenser may receive a container of certain size (such as an ice cream cone or a pancake cone, a cup or other similar containers with an open top). The container is placed in a suitable position by an operator to receive a specified amount of the product that is extruded through the dispensing outlet for selling or consumption. Therefore, in-cup quality of the product bought by an end consumer directly depends on the control of the food raw material by the dispenser. That is to say, high stability, accuracy and reliability of the control of the product characteristics by a food product dispenser can ensure that the characteristic of a product bought at any time and in any environment has always been consistent.

The following illustration is made by taking an ice cream dispenser for example.

Figure 2:
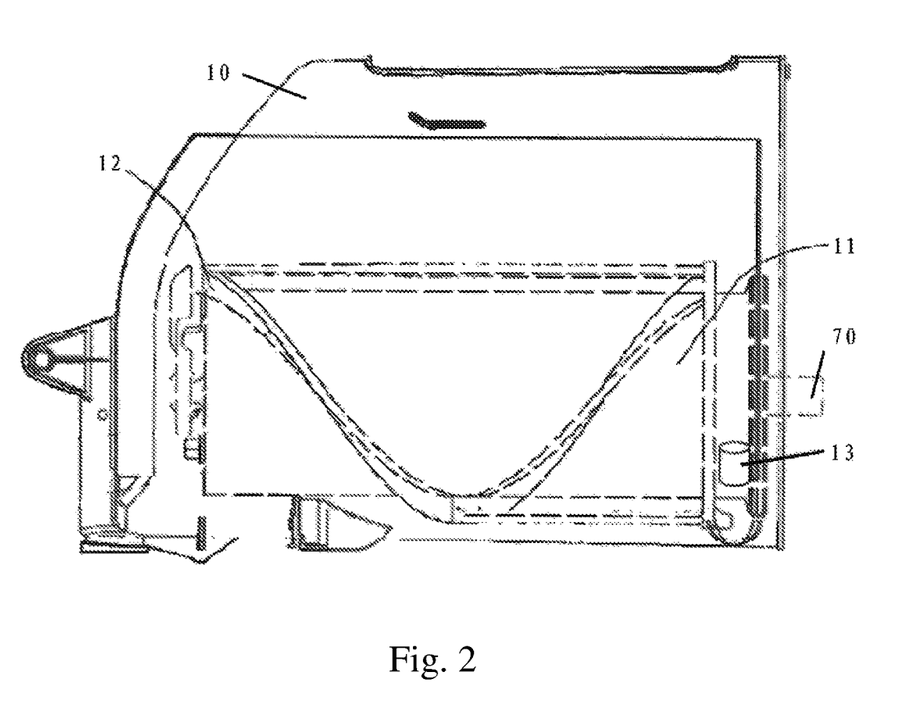
FIG. 2 shows part of the internal components of the dispenser, in particular the stirring means and the temperature sensor.
Figure 3:
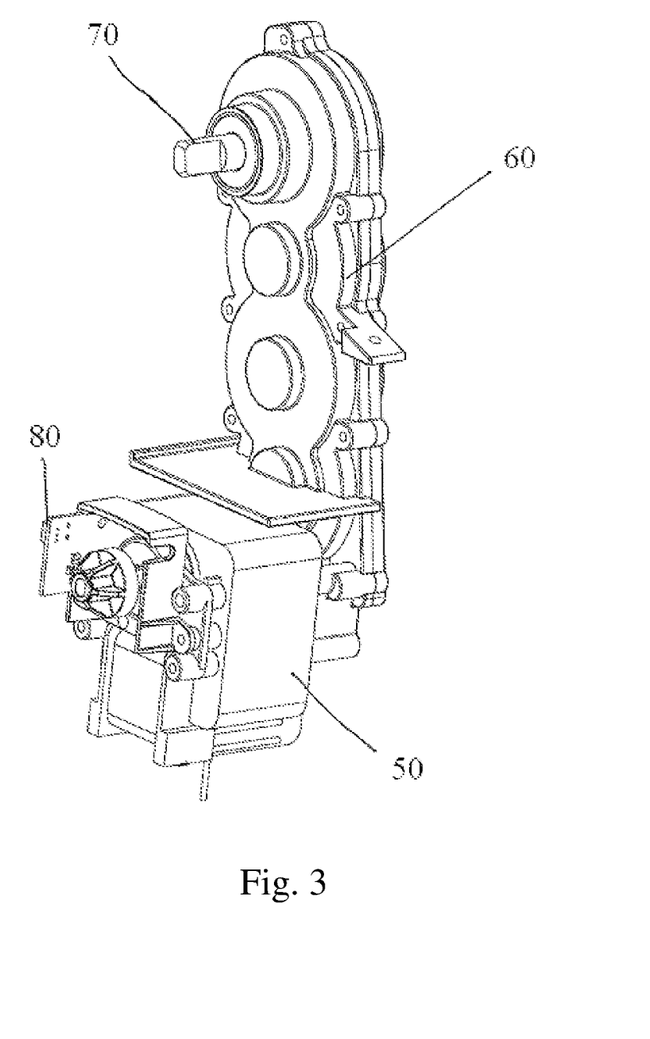
FIG. 3 shows a motor and a reduction gear box of the dispenser shown in FIG. 1, wherein a rotation speed sensor is mounted on or near a motor output shaft to directly detect the rotation speed thereof.
Figure 4:
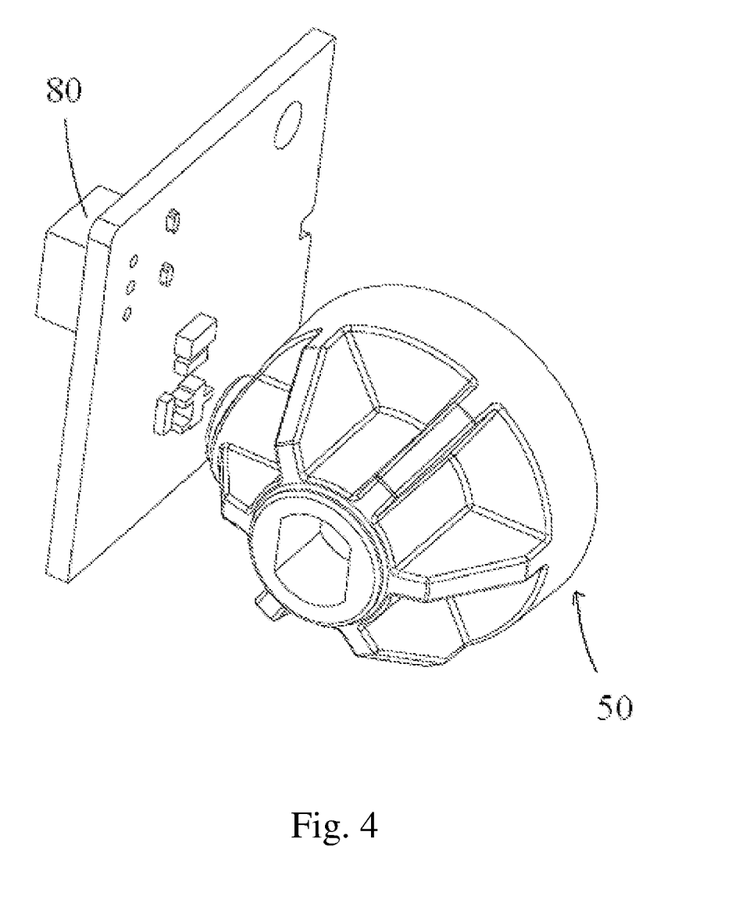
FIG. 4 shows a rotation speed sensor mounted near the motor output shaft.

Referring to FIG. 1 and FIG. 2, a typical ice cream dispenser is mainly composed of a raw material hopper 10, a cylinder type evaporator 11 arranged in the raw material hopper, a scraper 12 for stirring and an extruder for extruding the raw material to a dispensing outlet. Usually the ice cream dispenser is used at a environment temperature of +20° C. to +39° C., at which temperature the ice cream raw material is prone to melt. In most cases the temperature regulating means used for regulating the temperature of the ice cream raw material is embodied as a refrigerating means for inputting cold energy into the raw material according to the specific situation. As a part of a refrigeration circuit, the cylinder type evaporator is configured for a refrigerant to flow and evaporate therein to absorb and take away the heat from the ice cream raw material in the raw material hopper so that the ice cream raw material is maintained at an appropriate temperature. The refrigeration circuit also comprises components such as a compressor 40, a radiator, a throttle valve and so on. These components form a closed loop, in which the refrigerant is circulating and flowing. The scraper for stirring is driven by a motor 50 to rotate. As shown in FIGS. 3 and 4, a motor output shaft is connected to a reduction gear box 60 by means of which an output torque from the motor is transmitted to a stirring shaft 70 on which the scraper is mounted.

Preferably, the rotation speed sensor 80 is arranged on or near the motor output shaft to monitor a rotation speed fluctuation of the latter, which is favorable for enlarging a resolution ratio. The application of the ice cream dispenser has a relevant resolution ratio of 1% (the actual difference 30 RPM/2700 RPM). In fact, with the influence from the environment, the actual rotation speed of the motor output shaft varies from 2200 to 2700 RPM. In terms of the measurement range of this rotation speed, the precision of current rotation speed sensor may enable to ensure that the resolution ratio is high enough for the rotation speed fluctuation amplitude. Consequently, the rotation speed change of the scraper can be reflected precisely and directly by measuring the rotation speed of the motor output shaft.

Figure 5:
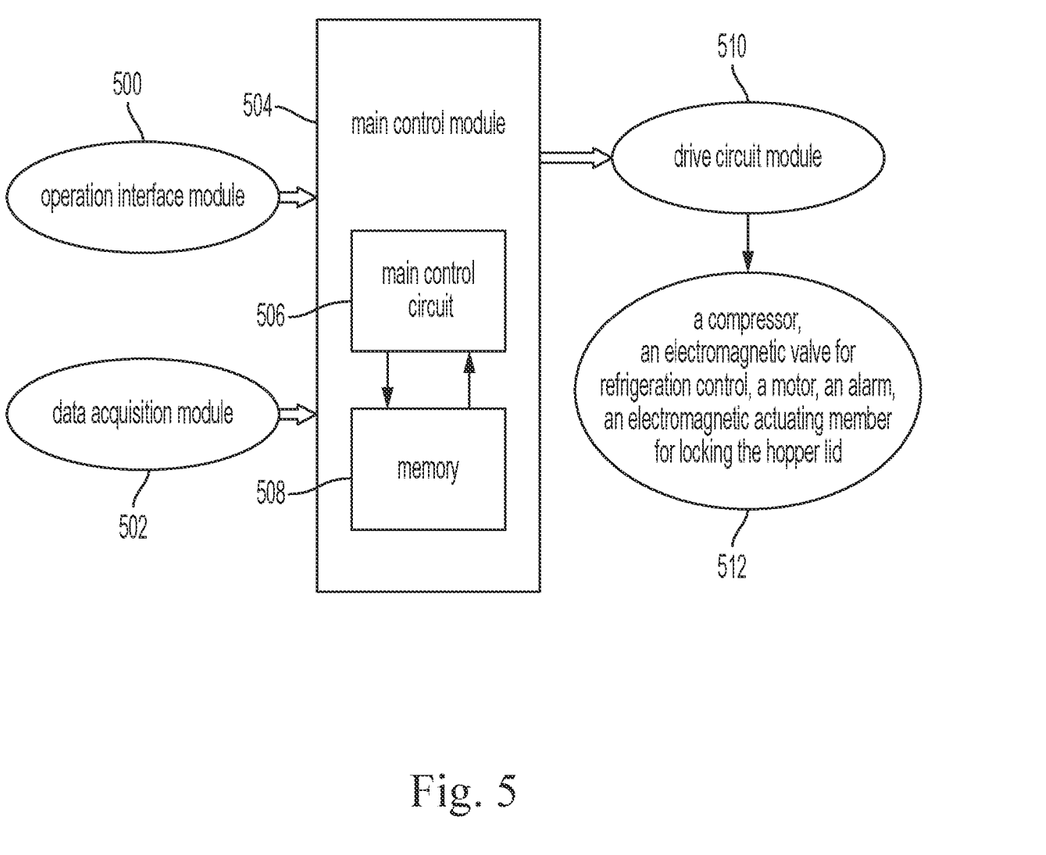
FIG. 5 is a view of a control module of a control system according to the present invention.

The control system for the dispenser according to the invention comprises: an operation interface module 500 which may include operation members such as a product identifier, a confirmation button, a cleaning button; a data acquisition module 502 which includes a sensor for determining the position of the raw material hopper or of a hopper lid, a temperature sensor for measuring an environment temperature, a temperature sensor 13 for measuring a temperature of the raw material within the raw material hopper, and a rotation speed sensor 80 for measuring a rotation speed of the motor output shaft and/or a rotation speed of the scraper; a drive circuit module 510 configured to drive executing elements such as temperature regulating means or components connected therewith (for example, a compressor, an electromagnetic valve for refrigeration control in the application of the ice cream dispenser), a motor, an alarm, an electromagnetic actuating member for locking the hopper lid 512; and a main control module 504 which comprises a printed circuit board and a memory 508 configured for data communication with the printed circuit board. The printed circuit board may comprise a main control circuit 506, such as a microprocessor circuit, which can be programmed to realize the functional control of the machine.

Figure 6:
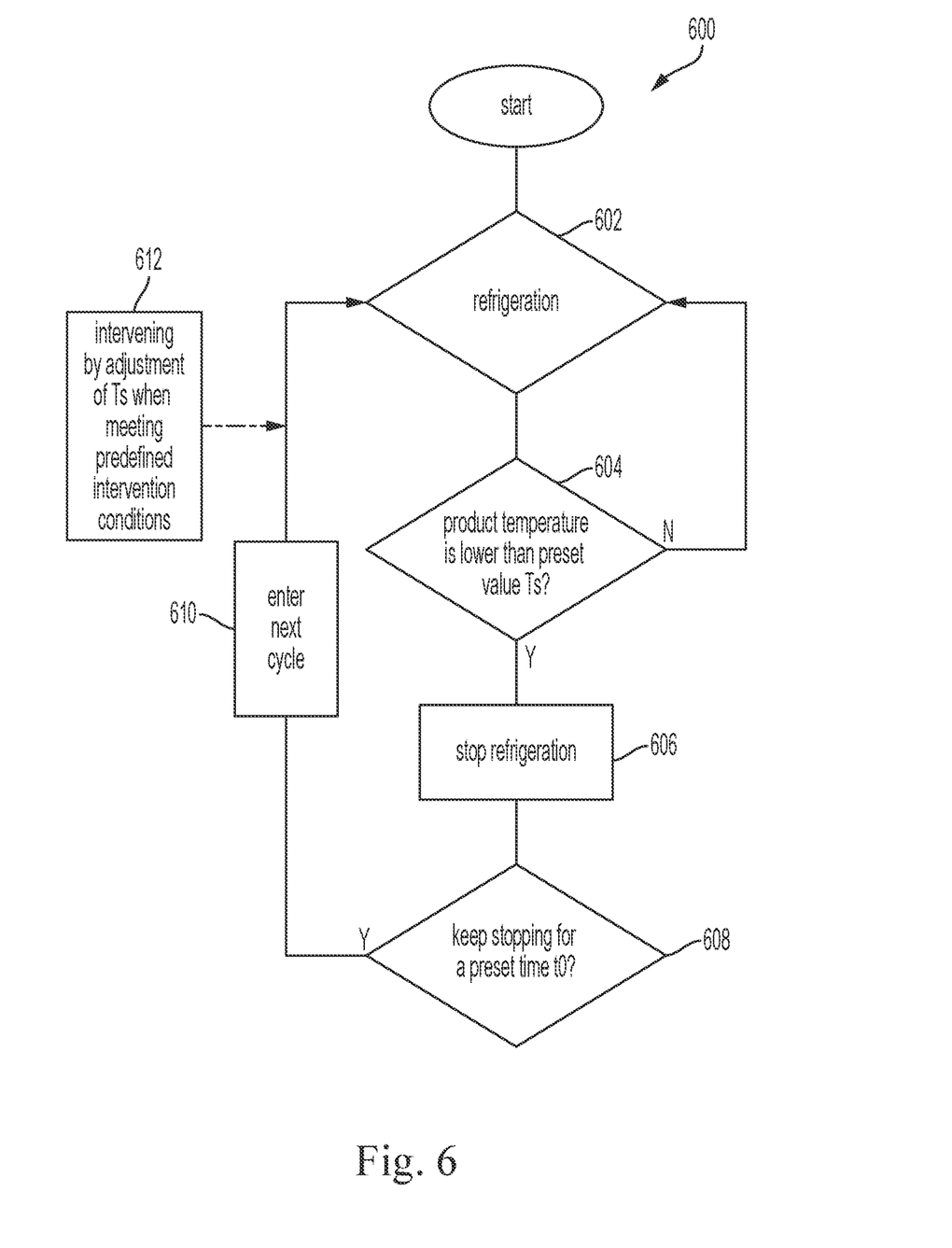
FIG. 6 shows a control flow chart of a control method for frozen food dispenser according to the present invention.

Referring to FIG. 6, tests have been made on an example of the ice cream dispenser. The control method 600 of the present invention is illustrated with reference to the steps performed in the tests.

The temperature sensor for measuring the temperature of the raw material in the raw material hopper is of a thermal resistor type 10K3A1I, the precision of which is +/−0.5° C. within the temperature range −10~0° C. and +/−0.1° C. within the temperature range 0~70° C. The rotation speed sensor for measuring the rotation speed of the scraper is a Hall sensor S100_400_01-06, the precision of which is +/−1 round per minute within the range 0-3000 RPM. The product is dispensed from the machine every 20 minutes to collect the overrun data, and then poured back to the product hopper. The rotation speed is measured per second, wherein overrun of ice cream=(container volume−((mass of the product and container−mass of the container without the product)/ice cream density))/((mass of the product and container−mass of the container without the product)/ice cream density).

First, a 4.7 L large package of raw frozen material is poured into the raw material hopper of the dispenser according to the invention, and a power for the dispenser is switched on, and a control program is activated to enter a first stage (a pre-stable stage). Then the scraper keeps stirring to carry out pre-mixing. The duration of the pre-stable state can be set in the memory as a preset variable tp, which is for example equal to 2 hours (tp may be any value selected from 0-2 hours). In the pre-stable state, the temperature sensor and the rotation speed sensor continuously send the measurement data signals to the main control module 504 which analyzes the data received and determines that the characteristic of the product is in a preliminary stable state when the rotation speed of the motor output shaft is lower than a rotation speed preset value Ro (for example, 2200 RPM, Ro may be selected from 1800-2300 RPM), or when the measurement temperature of the food product is lower than a temperature preset value Ts0 (for example, −6.6° C., Ts0 may be selected from −5.9° C. to −7.0° C.).

The machine enters a second stage (stable stage) when its operation time reaches a time set by the preset variable tp. The main control module 504 sends a command to the compressor, instructing the compressor to begin working such that the refrigerant is caused to flow through the cylinder type evaporator in the raw material hopper to cool the raw material therein (block 602). At the same time, the value of the product temperature and the value of the rotation speed of the motor output shaft are continuously recorded. The main control module compares the product temperature measured with the target preset value Ts (which is −6.3° C. in this embodiment) (block 604), determines to keep the compressor being on when the product temperature is higher than or equal to the current target preset value Ts (block 602), and sends a stop instruction to the compressor to stop it (block 606) and keep it off for a fixed duration t0 (block 608) (for example, 4 minutes and a half), when the product temperature is lower than the target preset value Ts. Meanwhile the rotation speed value of the motor output shaft is recorded continuously. It is found from the actual measurement that the rotation speed of the motor output shaft changes cyclically: during a first time period from the start of the compressor to the stop thereof, the rotation speed value of the motor output shaft drops from a maximum value Maxindex to a minimum value Minindex in a curve similar to a part of a sinusoid, whereas during a second time period in which the off state of the compressor is maintained for a fixed duration t0, the rotation speed value of the motor output shaft increases from the minimum value Minindex in a curve similar to another part of a sinusoid, wherein a sum of the first time period and the second time period can be regarded as a cycle. Immediately after the off state of the compressor lasts for the fixed duration t0, the main control module commands the compressor to start again, and enters the next cycle in which the rotation speed change of the motor output shaft follows nearly the same rule.

In order to obtain the prediction of the variation trend of the overrun of ice cream, the main control module 504 processes and analyzes the data collected and stored. The data are processed and analyzed in the following manner: m sample points (including the first rotation speed maximum value and the last rotation speed minimum value) are extracted from the rotation speed data set in the first time period of each cycle, with the mean value of all the sample points being an index $M_n$ of the cycle (n means the nth cycle obtained in the stable stage). To take cycle 15 for example (the cycle is the $15^{th}$ cycle), all the points between the Maxindex and the Minindex are extracted to obtain a mean value of 2668 RPM, i.e. $M_{15}$=2668 RPM. The rotation speed data is collected continuously and processed in the same way to obtain the index data of multiple consecutive cycles, e.g. cycle 15 to 20 (it is preset in the main control module 504 that the number of the consecutive cycles considered is i, wherein i is a reasonable integer, i=6 in this embodiment), with the corresponding index data being 2668, 2660, 2662, 2670, 2660, 2672.

The main control module 504 stores and analyzes these index data. When there comes a time where the index data of consecutive i cycles indicates a monotonically increasing trend in a sequence of time and the increase of the index data of the last cycle in the i cycles as compared with that of the first cycle is greater than a preset value V0 (which is 10 in this embodiment), it is predicted that the overrun of the ice cream will drop in a few hours (which may happen in 2 hours in terms of the application of ice cream). Then the main control module 504 determines that a temperature-reducing intervention program should be triggered upon entering the next cycle. To take the application of ice cream as an example, the index data of circles 19 to 24 are 2660, 2667, 2678, 2679, 2679, 2680, with the latter data being greater than or equal to the previous data, and the last index data 2680 being greater than the first index data 2660 by 20, which exceeds the preset value V0. The temperature-reducing intervention is triggered to lower the current target preset value Ts by a certain value Δt (which is 0.2° C. in this embodiment). That is to say, if the current target preset value Ts is e.g. −6.3° C. during the $19^{th}$-$24^{th}$ cycles, through the intervention, the target preset value Ts is updated to be −6.5° C. which is adopted during the $25^{th}$ cycle. By virtue of this intervention, the operation time of the compressor during the $25^{th}$ cycle can be increased, for example, by about 10%, to provide sufficient cold energy to cool the raw material. In practice, the cooling intervention can be repeatedly triggered, but the lowest target preset value Ts is not allowed to be less than −7° C. Once the target preset value Ts is lower than −7° C., the machine issues an alarm to inform the operator of possible machine failure or other potential risks.

When there comes a time where the index data of consecutive i cycles indicates a monotonically decreasing trend in a sequence of time and the decrease of the index data of the last cycle in the i cycles as compared with that of the first cycle is greater than a preset value Vd (which is 10 in this embodiment), it is predicted that the overrun of the ice cream will rise in a few hours (which may happen in 2 hours in terms of the application of ice cream). Thus, the main control module 504 determines that a temperature increasing intervention program should be triggered upon entering the next cycle. Taking the application of ice cream as an example, the index data of circles 29 to 34 are 2675, 2672, 2672, 2663, 2662 and 2659, with the latter data being less than or equal to the previous data, and the last index data 2659 being less than the first index data 2675 by 16, which exceeds the preset value Vd. The temperature increasing intervention is triggered to raise the current target preset value Ts by a certain value Δt (which is 0.2° C. in this embodiment). That is to say, if the current target preset value Ts is e.g. −6.5° C. during the $29^{th}$-$34^{th}$ cycles, through the intervention, the target preset value Ts is updated to be −6.3°

C. which is adopted during the 35$^{th}$ cycle, so that input of cold energy into the raw material in the raw material hopper is decreased. In practice, the temperature-increasing intervention can be repeatedly triggered, but the highest target preset value Ts is not allowed to be greater than −6° C. Once the target preset value Ts is greater than −6° C., the machine issues an alarm to inform the operator of possible machine failure or other potential risks.

In order to perform the above control algorithm, the main control module 504 communicates all the time with the operation interface module 500, the data acquisition module 502 and the drive circuit module 510 of the control system (see FIG. 5). During the operation of the machine, the main control module 504 receives data signals from the rotation speed sensor and the temperature sensor, compares an actual food temperature monitored by the temperature in real time with a preset target temperature, controls operation of the temperature regulating means based on the comparison result, and at the same time analyzes and processes the data measured by the rotation speed sensor and determines whether a variation trend of the rotation speed meets intervention conditions. When the variation trend of the rotation speed meets the intervention conditions, the main control module 504 issues a corresponding intervention instruction to the temperature regulating means to update the target preset temperature of the food correspondingly and continues to control operation of the temperature regulating means according to the comparison result between the actual food temperature monitored by the temperature sensor in real-time and the updated target temperature.

Preferably, the main control module 504 also comprises a protection control module which activates a protection mode in response to abnormal conditions of the machine. For example, when the system is determined to be abnormal due to the appearance of the rotation speed of the motor speed less than 200 RPM, or due to the appearance of the product temperature lower than −7.5° C., the protection control module commands the machine to stop working and enter the protection mode.

It can be seen from the above control flow 600 that the control system and method of the invention takes into consideration both the product temperature parameter which is an indirect indication of the viscosity of the product (for ice cream, overrun can be regarded as indicative of the viscosity) and the rotation speed parameter of the scraper (motor output shaft) which is a direct indication of the viscosity of the product, predicts the variation trend of the product viscosity based on the analysis of these parameters, and triggers in advance an intervention by which the target preset value Ts is adjusted accordingly (block 612) based on the prediction result to further control the input of heat energy/cold energy into the raw material so that the variation trend of the product viscosity is counteracted, thus maintaining dynamic balance of the product viscosity. Although the actual product temperature is fluctuated within a certain range, the amplitude of the fluctuation is always maintained within a narrow controllable range, so that the influence on the product viscosity (e.g. the overrun of the ice cream) is negligible. Also, the system and method of the invention is capable to adapt to the influence of environment, the change of environment temperature and the change of dispensing frequency and the like such that the product is always kept in a stable physical state, and the problems such as lagging of the prior art temperature-based control as well as great deviation of the prior art rotation speed-based control can be avoided.

Figure 7:
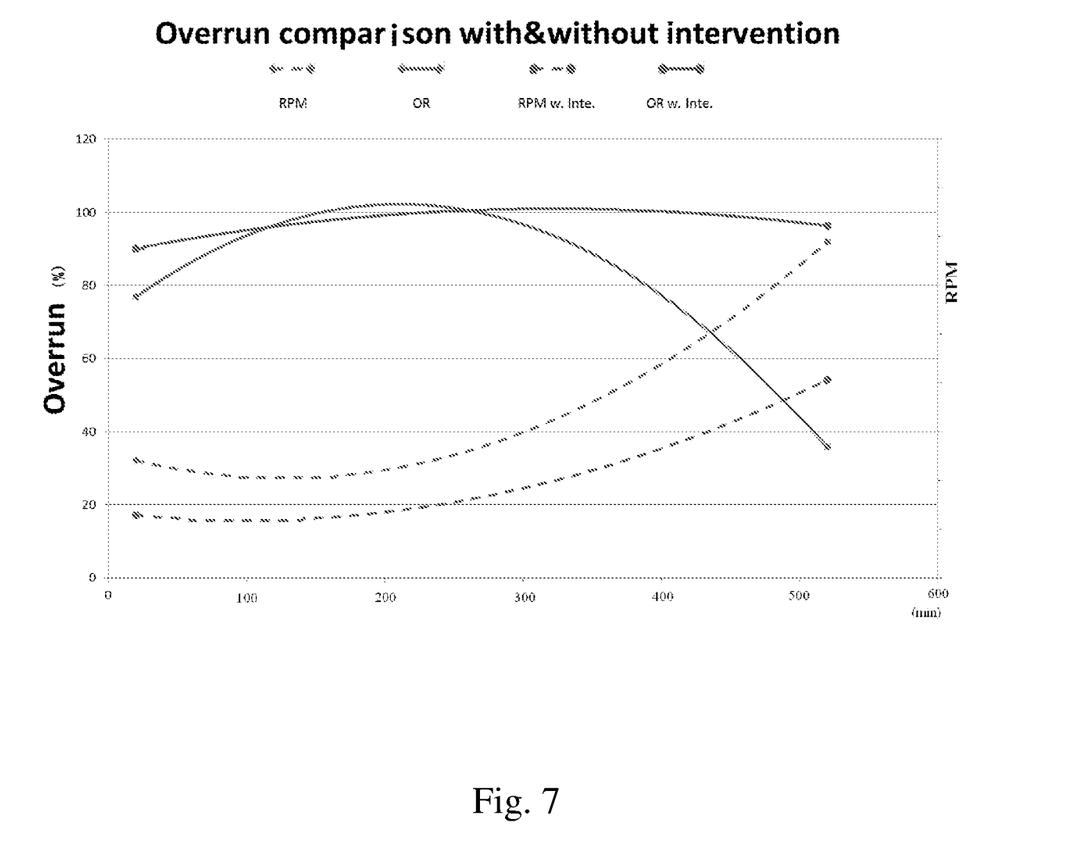
FIG. 7 shows a comparison result between the test carried out according to the control method of the present invention and the test carried out without any intervention.

FIG. 7 shows the results of the tests in which the ice cream products are dispensed by an operator with the same frequency in the same environment to monitor the viscosity of the product by measuring the overrun. It is found from the test result that when the test is ongoing without any intervention the overrun changes in such a manner: it rises to 105% and then drops lower than 40%, and the monitoring result of the rotation speed of the motor output shaft shows an identifiable increase; in contrast, by using the control method 600 of the present invention, when the viscosity tends to decrease, the main control module 504 triggers a temperature reducing intervention, so that more cold energy is applied to the raw material in the raw material hopper to maintain the stability of the overrun of the product, and meanwhile the rotation speed of the motor output shaft changes in a relatively small amplitude. From the comparison on the tests, it is found that the control method according to the invention can maintain the fluctuation of the temperature of the ice cream product ±0.2° C. at most. Thus, the product temperature is maintained at a constant level, and there is no great fluctuation in the rotation speed of the scraper. The ice cream product thus obtained always has a constant overrun. The machine thus exhibits more stable product characteristics and better in-cup quality.

Although some of the parameters in the above control method 600 are set based on the characteristics of ice cream products, those skilled in the art could envisage that the food dispensers for other viscous semi-liquid frozen products like slushes, chocolate syrup and milk shake can be controlled by the same control logic, and the only difference from the example of ice cream lies in that part of the control parameters may need to be adjusted so as to adapt to the characteristics of particular food products.

Also, the control system and method 600 of the present invention is applicable to a hot fluid-dispensing application in which a viscous semi-fluid food is required to be kept at a temperature higher than the environment temperature, for example, in a winter season. Taking the dispensing of hot drinkable chocolate syrup for example, its control algorithm 600 differs from that for ice cream dispenser mainly in the following points: 1) when comparing a food temperature detected by the temperature sensor with a target preset value of the food temperature, the main control module is configured to determine to continue the heating when the food temperature is lower than or equal to the target preset value, and to stop the heating and keep stopping for a preset time when the food temperature is greater than the target preset value; 2) the main control module is configured to raise the target preset value of the food temperature when the plurality of cycle index data shows a monotonically increase according to time sequence of the cycles, and a difference between the maximum index data and the minimum index data is larger than a preset difference value; 3) the main control module is configured to lower the target preset value of the food temperature when the plurality of cycle index data shows a monotonically decrease according to time sequence of the cycles, and the difference between the maximum index data and the minimum index data is larger than the preset difference value.

Moreover, although it is described in the above that the index of each cycle is obtained by taking arithmetic mean of the sample points of the rotation speed, it can be appreciated that other data processing method, for example, method of taking geometric mean, can be adopted to calculate out the index of each cycle.

In addition, although in the above embodiments, the input of the cold energy into the raw material is adjusted by controlling the compressor in response to the adjustment of the preset target value, those skilled in the art may understand that intervention may be implemented by adjusting the operation time period parameter of the compressor or adjusting the flow rate of the refrigerant directly based on the adjustment of the preset target value. The correspondingly adjusted preset target value serves as an important threshold value of the next cycle during the stable stage after the intervention is carried out.

As used in this specification, the words "comprises", "comprising", and similar words, are not to be interpreted in an exclusive or exhaustive sense. In other words, they are intended to mean "including, but not limited to".

Although the invention has been described by way of example, it should be appreciated that variations and modifications may be made without departing from the scope of the invention as defined in the claims. Furthermore, where known equivalents exist to specific features, such equivalents are incorporated as if specifically referred in this specification. The description and embodiments shall be considered exemplary only and the true scope of the invention is defined by the annexed claims and equivalents thereof.

The invention claimed is:

1. A control method for a viscous semi-liquid frozen food dispenser comprising a stirrer configured to stir the food, a motor configured to drive the stirrer to rotate, a refrigerating member configured to input cold energy into the food, a rotation speed sensor configured to detect a stirring speed, and a temperature sensor configured to detect a food temperature, the control method comprising the steps of:
   a) refrigerating the food by the refrigerating member;
   b) comparing a food temperature detected by the temperature sensor with a target preset value of the food temperature, and determining to continue the refrigeration when the food temperature is greater than or equal to the target preset value, and to stop the refrigeration and keep stopping for a preset time when the food temperature is lower than the target preset value;
   c) intervening by corresponding adjustment of the target preset value when a data set collected from the rotation speed sensor shows that change trend of the rotation speed meets predefined intervention conditions; and
   d) returning to step a) for the next cycle.

2. The control method according to claim 1, wherein the rotation speed sensor measures a rotation speed of a motor output shaft.

3. The control method according to claim 1, wherein a data set in step c) is composed of a plurality of cycle index data of a plurality of consecutive cycles.

4. The control method according to claim 1, wherein a cycle consisting of a step a) and a step b), the rotation speed data measured during the refrigeration period is averaged to serve as the cycle index data.

5. The control method according to according to claim 4, wherein the target preset value of the food temperature is lowered when the plurality of cycle index data shows a monotonically increase according to time sequence of the cycles, and a difference between the maximum index data and the minimum index data is larger than a preset difference value.

6. The control method according to according to claim 5, wherein the target preset value of the food temperature is adjusted by a constant value.

7. The control method according to according to claim 4, wherein the target preset value of the food temperature is raised when the plurality of cycle index data shows a monotonically decrease according to time sequence of the cycles, and the difference between the maximum index data and the minimum index data is larger than the preset difference value.

8. A control method for a viscous semi-liquid hot food dispenser comprising a stirring member configured to stir the food, a motor configured to drive the stirring means to rotate, a heater configured to input heat energy into the food, a rotation speed sensor configured to detect a stirring speed, and a temperature sensor configured to detect a food temperature, the control method comprising the steps of:
   a) heating the food by the heater;
   b) comparing a food temperature detected by the temperature sensor with a target preset value of the food temperature, and determining to continue the heating when the food temperature is lower than or equal to the target preset value, and to stop the heating and keep stopping for a preset time when the food temperature is greater than the target preset value;
   c) intervening by corresponding adjustment of the target preset value when a data set collected from the rotation speed sensor shows that change trend of the rotation speed meets predefined intervention conditions; and
   d) returning to step a) for the next cycle.

9. The control method according to claim 8, wherein the rotation speed sensor measures a rotation speed of a motor output shaft.

10. The control method according to claim 8, wherein a data set in step c) is composed of a plurality of cycle index data of a plurality of consecutive cycles.

11. The control method according to claim 10, wherein during a cycle consisting of a step a) and a step b), the rotation speed data measured during the heating period is averaged to serve as the cycle index data.

12. The control method according to claim 11, wherein the target preset value of the food temperature is raised when the plurality of cycle index data shows a monotonically increase according to time sequence of the cycles, and a difference between the maximum index data and the minimum index data is larger than a preset difference value.

13. The control method according to according to claim 11, wherein the target preset value of the food temperature is lowered when the plurality of cycle index data shows a monotonically decrease according to time sequence of the cycles, and the difference between the maximum index data and the minimum index data is larger than the preset difference value.

14. The control method according to according to claim 8, wherein the target preset value of the food temperature is adjusted by a constant value.

15. A control system for a viscous semi-liquid food dispenser comprising a stirrer configured to stir a food, a motor configured to drive the stirrer to rotate, a temperature regulator configured to input heat energy or cold energy into the food, the control system comprising a main control module and a data acquisition module comprising a rotation speed sensor configured to detect a stirring speed and a temperature sensor configured to detect a food temperature, the main control module is configured to receive data signals from the rotation speed sensor and the temperature sensor, control operation of the temperature regulator based on a comparison result between an actual food temperature and a target preset value of the food temperature, and analyze rotation speed data from the rotation speed sensor so that when the data analysis shows that the change trend of the rotation speed meets predefined intervention conditions, intervention is carried out by corresponding adjustment of the target preset value.

16. The control system according to claim 15, wherein the rotation speed sensor is mounted on or near a motor output shaft for detecting the rotation speed thereof.

17. The control system according to claim 15, wherein the temperature regulator is a refrigerator.

18. The control system according to claim 17, wherein the refrigerator comprises a refrigeration circuit with a compressor, and the main control module controls on or off of the compressor based on the comparison result between the actual food temperature and the target preset value of the food temperature.

19. The control system according to claim 15, wherein the temperature regulator is a heating member.

\* \* \* \* \*